United States Patent [19]

Friedline

[11] Patent Number: 4,659,264
[45] Date of Patent: Apr. 21, 1987

[54] DRILL AND INDEXABLE CARBIDE INSERT THEREFOR

[75] Inventor: Ernest J. Friedline, Latrobe, Pa.

[73] Assignee: Kennametal Inc., Latrobe, Pa.

[21] Appl. No.: 792,626

[22] Filed: Oct. 25, 1985

Related U.S. Application Data

[63] Continuation of Ser. No. 395,604, Jul. 6, 1982, abandoned.

[51] Int. Cl.[4] ............................................. B23B 51/02
[52] U.S. Cl. .................................... 408/204; 407/42; 407/113; 407/116; 408/231; 408/713
[58] Field of Search ............... 408/204, 207, 227, 231, 408/713, 705; 407/36, 40, 42, 48, 113, 114, 116

[56] References Cited

U.S. PATENT DOCUMENTS

| 1,230,569 | 6/1917 | Dixon | 408/231 |
|---|---|---|---|
| 3,681,830 | 8/1972 | Dupuis | 407/113 |
| 3,781,956 | 1/1974 | Jones et al. | 407/113 |
| 4,220,429 | 9/1980 | Powers et al. | 408/224 |
| 4,278,373 | 7/1981 | Wolfe, III | 407/114 |
| 4,373,839 | 2/1983 | Negishi et al. | 408/59 |

FOREIGN PATENT DOCUMENTS

| 54-69888 | 6/1979 | Japan | 407/36 |
|---|---|---|---|
| 54111 | 4/1980 | Japan | 408/227 |
| 56-134112 | 10/1981 | Japan | 408/233 |
| 1592154 | 7/1981 | United Kingdom | 407/42 |
| 921708 | 4/1982 | U.S.S.R. | 408/207 |

Primary Examiner—Gil Weidenfeld
Assistant Examiner—Daniel W. Howell
Attorney, Agent, or Firm—John J. Prizzi

[57] ABSTRACT

A drill has a shank with a central axis of rotation and at least one insert on one end of the shank. The insert has at least two cutting edges. The first cutting edge has a negative radial rake and the second cutting edge has negative axial and positive radial rake surface. The first and second cutting edges cooperate to form a radiused hole when rotated about the central axis. Also, the cutting insert is composed of hard wear resistant material. The insert has top and bottom faces and a peripheral wall joining the top and bottom faces. The insert body is polygonal when viewed in plan. One of the top and bottom faces acts as a seating face and the other acts as a cutting face. There are first cutting edges formed on opposite sides of the cutting face at the juncture of the cutting face with the peripheral wall. One end of each of the first cutting edges terminates in a juncture with a second cutting edge that extends from the cutting face toward the seating face. The first and second cutting edges cooperate to form a radiused hole when rotated about a central axis.

15 Claims, 17 Drawing Figures

DRILL AND INDEXABLE CARBIDE INSERT THEREFOR

This application is a continuation of application Ser. No. 395,604, filed 7/6/82, now abandoned.

BACKGROUND OF THE INVENTION

This invention relates to the field of metal-cutting tools and, more specifically, it relates to those metalcutting tools known as drills.

The prior art method of drilling holes has been by the use of twist drills, twist drills with brazed carbide tips or drills having indexable carbide inserts. The use of drills having indexable carbide inserts is often preferred because of their consistent quality and overall cost effectiveness.

Notwithstanding the economical advantages of drills having indexable carbide inserts, twist drills are still used for holes under about one-half inch in diameter. The principal reason for still using the small twist drills is that it has generally been thought to be impractical to manufacture a small drill having indexable carbide inserts.

It would be desirable to have a small drill that uses indexable carbide inserts because such a tool can drill at higher speeds, for longer periods of time and for less cost than twist drills.

However, the obstacles to manufacturing a small drill having indexable carbide inserts are twofold. Since such drills have a minimum of two inserts, the inserts would have to be made very small so as to both fit on the drill shank. These inserts would be costly to make as well as difficult to handle. The first obstacle then is that a drill employing small indexable carbide inserts simply would not be economical to manufacture. The second obstacle is that the shank would become too weak to withstand the anticipated cutting loads if two inserts were placed on the same end of the shank.

Applicant, however, has solved the problems of the prior art by utilizing a single indexable carbide insert that acts as if it were two inserts. So far as applicant is aware, this is the first use of a single indexable insert on a drill.

A single carbide tip has been used in a ball end mill as shown in U.S. Pat. No. 4,132,493.

It is thus an object of this invention to manufacture a drill that uses indexable carbide inserts and that can drill holes under about one-half inch in diameter.

It is another object of this invention to economically manufacture a drill that uses indexable carbide inserts and that can drill holes under about one-half inch in diameter.

It is a still further object of this invention to manufacture a small drill that uses indexable carbide inserts and that can effectively replace twist drills.

BRIEF SUMMARY OF THE INVENTION

According to the invention, there is provided a drill with a shank having a central axis of rotation. There is at least one insert on one end of the shank. The insert has at least two cutting edges. The first cutting edge has a negative radial rake surface and the second cutting edge has negative axial and positive radial rake surfaces. The first and second cutting edges cooperate to form a radiused hole when rotated about the central axis.

The central axis of rotation passes through the axial rake face of the second cutting edge. The first cutting edge may have zero axial rake or positive axial rake.

Preferably, the insert is indexable.

In a preferred embodiment, the first cutting edge is substantially perpendicular to the central axis of rotation so that a hole with a substantially flat bottom is formed.

Preferably, the insert is in the shape of a diamond when viewed in plan and the smaller of the included angles of the diamond is between 75 degrees and 85 degrees. It is also preferable for the insert to be in the shape of a square when viewed in plan.

The shank has a reduced diameter portion. The insert is held to the shank by fastening means passing through a perforation in the insert and terminating in a recess in the shank. The drill may also have means for supplying coolant which are internal to the shank and exit the shank at the end of the reduced diameter portion.

The second cutting edge axial rake face preferably extends outwardly with respect to the insert so as to break out of the insert.

In another embodiment, the insert has at least one other cutting edge having negative axial and positive radial rake surfaces. This at least one other cutting edge cooperates with the first and second cutting edges to form a radiused hole when rotated about the central axis.

In a further embodiment, the second cutting edge may be concave.

Still further, the insert has first and second cutting edges and a clearance face. The first cutting edge extends inwardly and parallel to a plane containing the axis of rotation. The second cutting edge extends inwardly from the first cutting edge and when viewed from the end forms an included angle of greater than 90 degrees therewith. The first and second cutting edges are oriented along the forward portion in the rotational sense of the clearance face. The clearance face intersects the plane without intersecting the axis of rotation. The first and second cutting edges cooperate so as to rotatably cut a hole.

The second cutting edge may comprise a plurality of cutting segments. The orientation of each of the segments differs in orientation from the previous cutting segment so that when viewed from the end the included angle between the first of said segments and the first cutting edge and the included angle between each subsequent cutting segment and the previous cutting segment is greater than 90 degrees.

In another embodiment, the second cutting edge is substantially concave. The concave cutting edge and its axial rake face form a groove which narrows in depth and width away from the concave cutting edge.

According to the invention, the cutting insert is composed of hard wear resistant material. The insert has top and bottom faces and a peripheral wall joining the top and bottom faces. The insert body is polygonal when viewed in plan. One of the top and bottom faces acts as a seating face and the other acts as a cutting face. There are first cutting edges formed on opposite sides of the cutting face at the juncture of the cutting face with the peripheral wall. One end of each of the first cutting edges terminates in a juncture with a second cutting edge that extends from said cutting face toward said seating face. The first and second cutting edges cooperate to form a radiused hole when rotated about a central axis.

Each of the second cutting edges has a rake face which extends upwardly away from the seating face so that it breaks out through the cutting face.

In other embodiments, each of the second cutting edges joins with at least one other cutting edge that extends toward the seating face. Alternatively, each of the second cutting edges is concave away from the seating face.

Still further, the insert has a top and bottom parallel to the top joined by four lateral faces. At least one of the lateral faces is a clearance face. The clearance face has a first cutting edge which is formed by the intersection of the top and the clearance face. The clearance face also has a second cutting edge intersecting the first cutting edge at an included angle of greater than 90 degrees when viewed perpendicularly to the clearance face. The second cutting edge is formed by the intersection of a rake face of the second cutting edge and the clearance face. The rake face is defined by a plane which intersects the clearance face, one of said lateral faces and the top. This plane is not perpendicular to either of the clearance face, lateral face or top so that a flat is formed extending away from the second cutting edge.

BRIEF DESCRIPTION OF THE DRAWINGS

The exact nature of the present invention will become more clearly apparent upon reference to the following detailed specification taken in connection with the accompanying drawings in which.

DETAILED DESCRIPTION OF THE INVENTION

Figure 1:
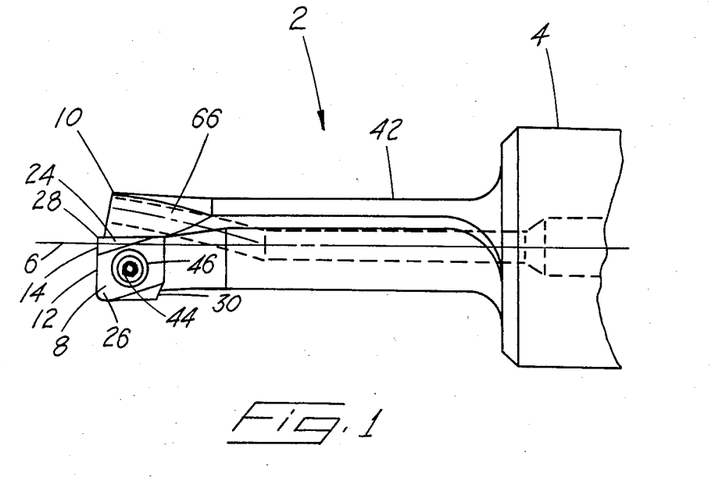
FIG. 1 is a side view of the drill according to the present invention.
Figure 2:
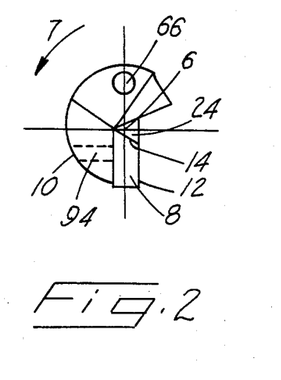
FIG. 2 is an end view of the drill in FIG. 1.
Figure 4:
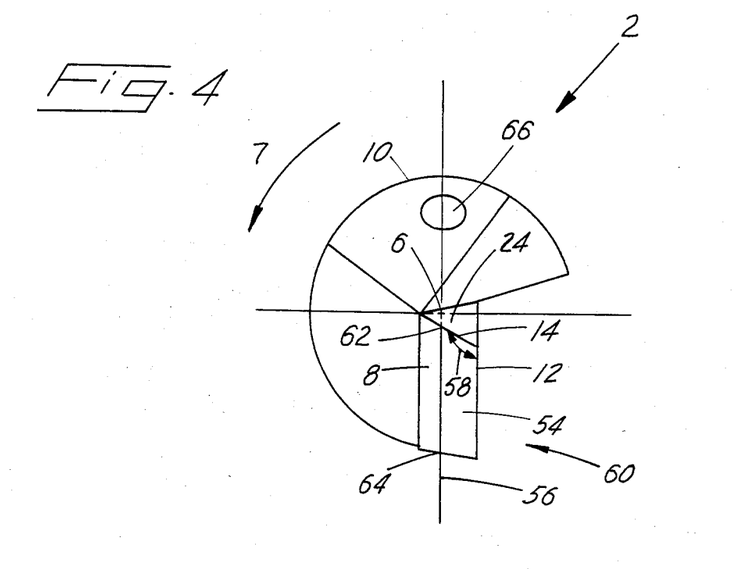
FIG. 4 is an enlarged view of FIG. 2.

Referring to the drawings and more particularly to FIGS. 1 and 2, there is shown a drill 2. The drill has a shank 4 having a central axis of rotation 6. The direction of rotation is shown by arrow 7. There is at least one insert 8 on one end 10 of the shank. For larger holes, the use of two or more inserts may be preferable. Referring also to FIG. 4, the insert has at least two cutting edges 12 and 14. The first cutting edge 12 has a negative radial rake surface and the second cutting edge 14 has negative axial and positive radial rake surfaces. Further, the first cutting edge 12 preferably has zero axial rake or positive axial rake. Also, the central axis of rotation 6 passes through the axial rake face 24 of the second cutting edge 14. The first and cutting edges cooperate to form a radiused hole when rotated about the central axis.

In addition to the first and second cutting edges 12,14, the insert 8 includes a clearance face 54. The first cutting edge 12 extends inwardly and parallel to a plane 56 containing the axis of rotation 6. This plane 56 is perpendicular to the plane of the paper. The second cutting edge 14 extends inwardly from the first cutting edge 12 and when viewed from the end forms an included angle 58 of greater than 90 degrees therewith. The first and second cutting edges 12,14 are oriented along the forward portion 60 in the rotational sense of the clearance face 54. The clearance face intersects the plane 56 without intersecting the axis of rotation.

Figure 3:
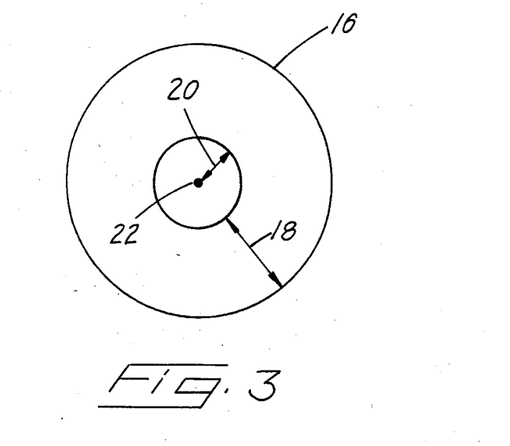
FIG. 3 is a schematic illustration of a hole made by a drill according to the invention.

The operation of the drill according to the invention can best be understood by referring to FIG. 3. FIG. 3 schematically illustrates a hole 16 being drilled by the drill according to the invention. The first cutting edge 12 removes the outer portion 18 of the hole while the second cutting edge 14 removes the inner portion 20 of the hole. The second cutting edge must be located slightly away from the axis of rotation so that there is never a point of zero velocity on the second cutting edge. Since the second cutting edge is slightly removed from the axis of rotation, a small nib 22 is left after each rotation of the drill. However, in the practical application of the drill, this nib would frequently break off during the drilling operation so as not to be evident in the finished hole.

This invention has been found to be most useful for drilling holes less than one inch in diameter and especially useful for drilling holes less than one-half inch in diameter. It is contemplated within the scope of this invention that this drill may also be used for holes larger than one inch in diameter. The preferred use of this invention is for holes less than about one inch in diameter, in which case one insert would preferably be used. However, drilled holes greater than about one inch in diameter are also contemplated within the scope of the invention. In this latter case, it may be found to be preferable to use two or more inserts.

Preferably, the central axis of rotation 6 passes through the axial rake face 24 of the second cutting edge 14.

It is preferred that the first cutting edge has zero axial rake or positive axial rake.

In a preferred embodiment, and as best shown in FIG. 1, the first cutting edge 12 is substantially perpendicular to the central axis of rotation 6 so that a hole with a substantially flat bottom is formed. It had previously been thought to be impossible to drill a flat bottom hole. However, according to the invention, a flat bottom hole is easily drilled.

Figure 7:
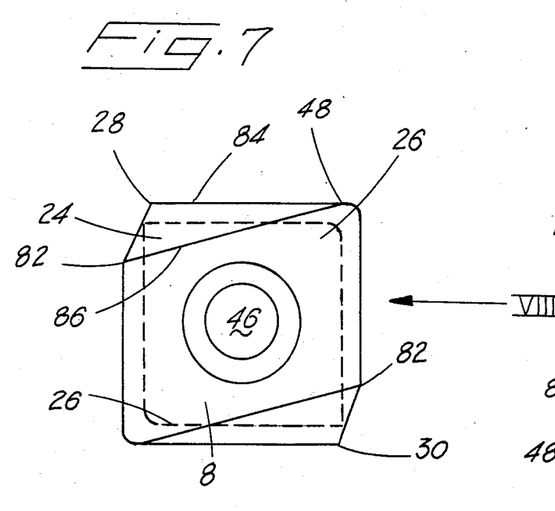
FIG. 7 is a plan view of the insert of FIG. 6.

Referring now to FIG. 7, the insert is preferably in the shape of a diamond when viewed in plan and the smaller of the included angles at 26 of the diamond is between 75 degrees and 85 degrees. Normally, there will be two cutting positions on the insert at 28 and 30.

Figure 5:
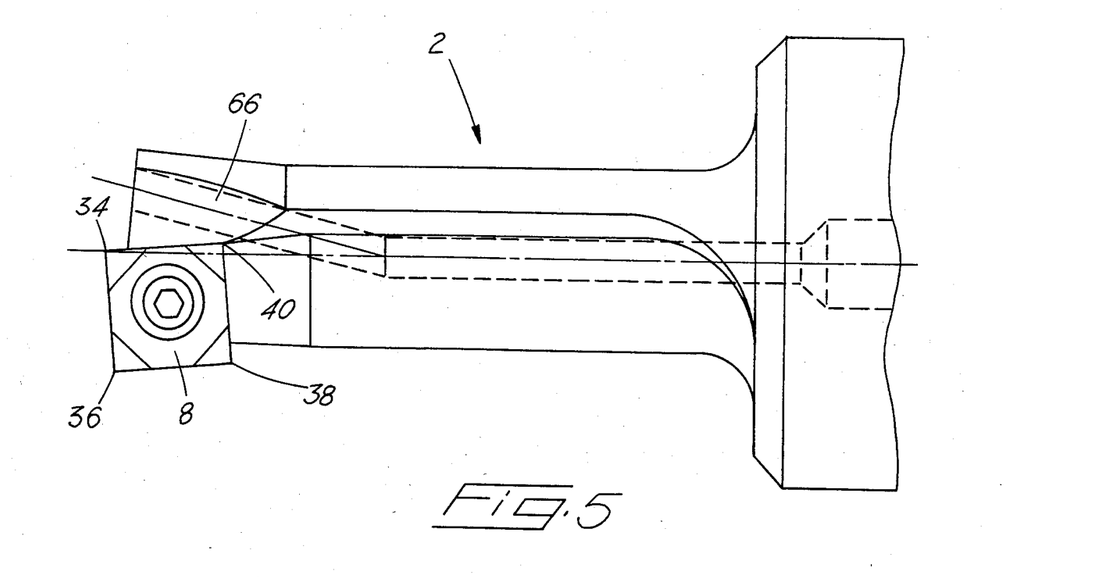
FIG. 5 is a side view of another embodiment of the drill according to the invention.
Figure 10:
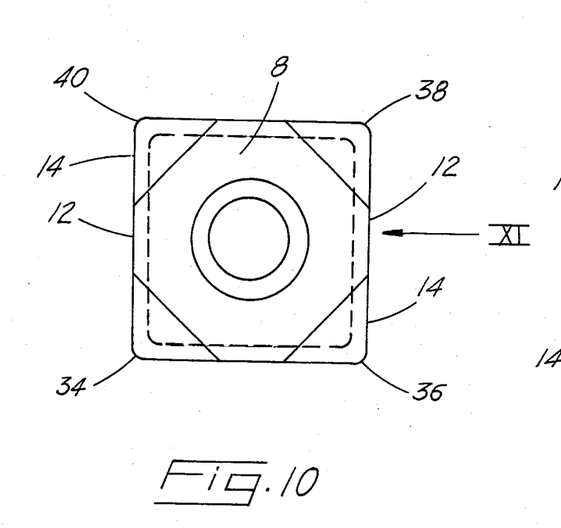
FIG. 10 is a plan view of the insert of FIG. 9.

Referring now to FIG. 5, there is another embodiment of the drill 2 wherein the insert 8, as seen also in FIG. 10, is in the shape of a square when viewed in plan.

The advantage of using a square insert is that four cutting positions 34, 36, 38 and 40 are now possible.

It should be noted that a flat bottom hole is no longer possible when a square insert is used. The reason is that a clearance angle is needed on the outside of the insert so that the side of the insert does not rub against the wall of the hole. To obtain this clearance angle, the insert must be tilted slightly, with the result that the first cutting edge would no longer be perpendicular to the axis of rotation.

Referring back to FIGS. 1 and 2, the shank preferably has a reduced diameter portion 42. The insert is disposed on the end 10 of the reduced diameter portion of the shank.

Preferably, the insert 8 is indexable. The insert is held to the shank by fastening means 44 passing through a perforation 46 in the insert. The fastening means terminates in a recess 94 in the shank portion 42. The fastening means may be any of those well known in the prior art.

The drill preferably comprises means 66 for supplying coolant. The coolant means are internal to the shank and exit the shank at the end 10 of the reduced diameter portion.

Figure 6:
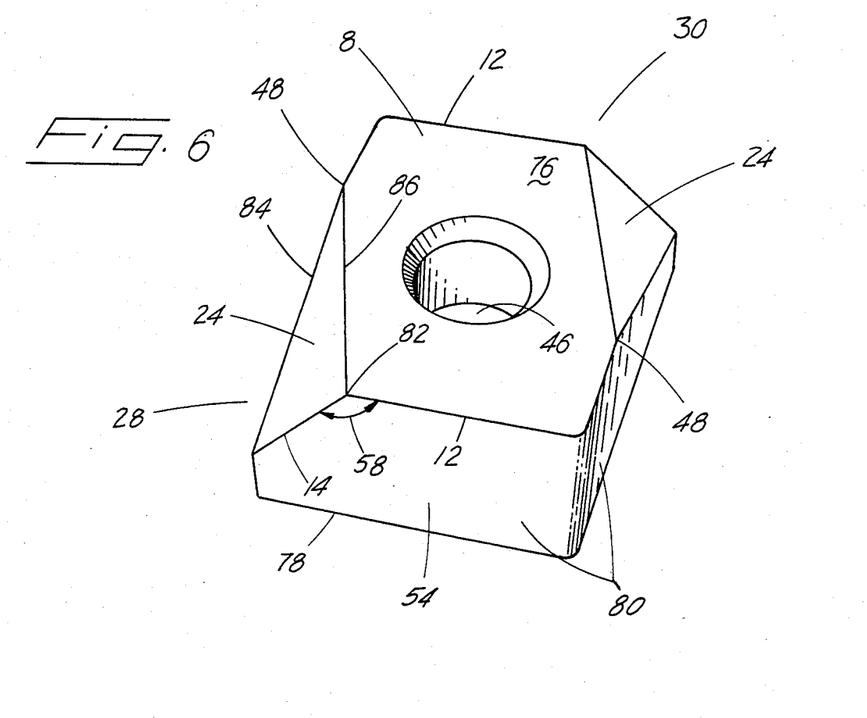
FIG. 6 is a perspective view of an insert according to the invention.
Figure 8:
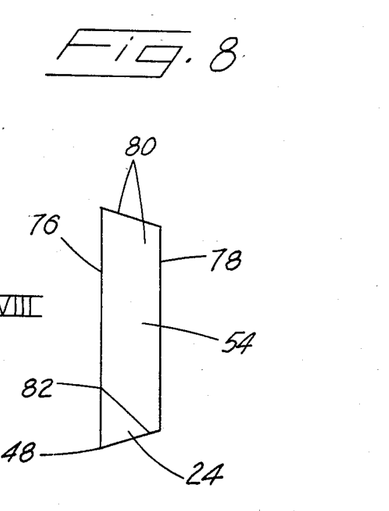
FIG. 8 is a view of FIG. 7 in the direction shown by arrow VIII.

According also to the invention, there are several embodiments of the cutting insert 8 disclosed in FIGS. 6 through 17. As shown in FIGS. 6 through 8, the insert is comprised of a body of hard wear resistant material having top 76 and bottom 78 faces and a peripheral wall 80 joining the top and bottom faces. The hard wear resistant material is preferably cemented carbide. The body is polygonal when viewed in plan. One of the top and bottom faces acts as a seating face and the other acts as a cutting face. First cutting edges 12 are formed on opposite sides of the cutting face at the juncture of the cutting face with the peripheral wall. One end of each of the first cutting edges terminates in a juncture 82 with a second cutting edge 14 that extends from the cutting face toward the seating face. The first and second cutting edges cooperate to form a radiused hole when rotated about a central axis.

Each of the second cutting edges has a rake face 24 which extends upwardly away from the bottom face so that it breaks out through the cutting face at 48.

It is preferable that the insert is indexable.

Preferably, the insert is in the shape of a diamond when viewed in plan and the smaller of the included angles at 26 of the diamond is between 75 degrees and 85 degrees. As shown in the figures, there would normally be two cutting positions located at 28 and 30.

Figure 9:
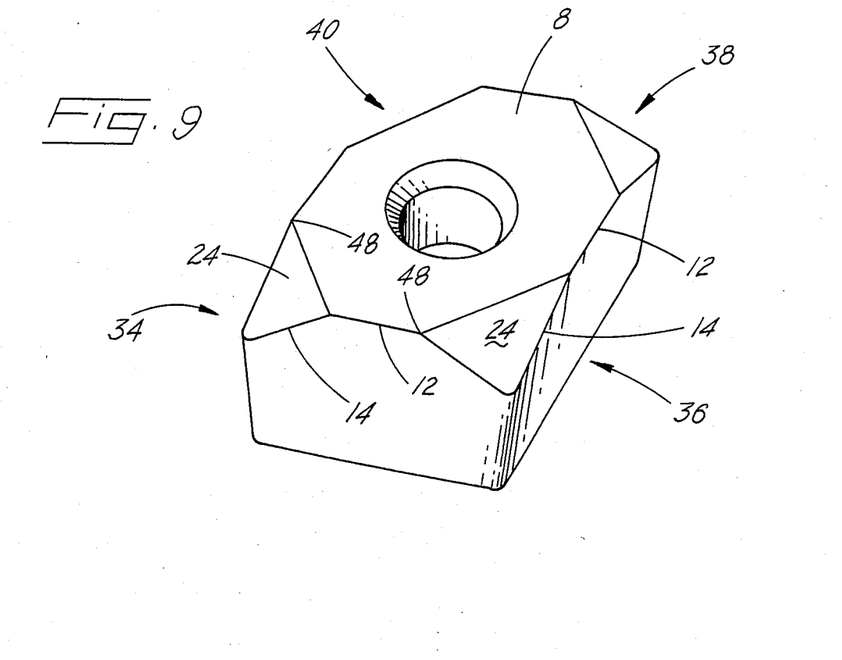
FIG. 9 is a perspective view of another insert according to the invention.
Figure 11:
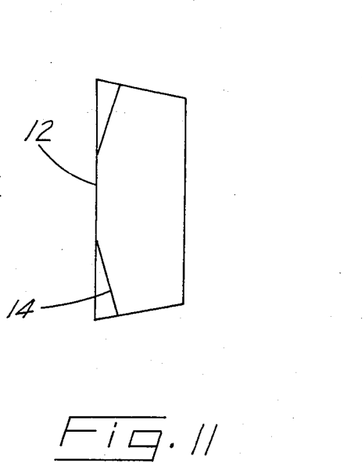
FIG. 11 is a view of FIG. 10 in the direction of arrow XI.

Referring now to FIGS. 9 through 11, the insert may be in the shape of a square when viewed in plan. When the insert has a square shape, there would normally be four cutting positions located at each corner of the square.

Figure 12:
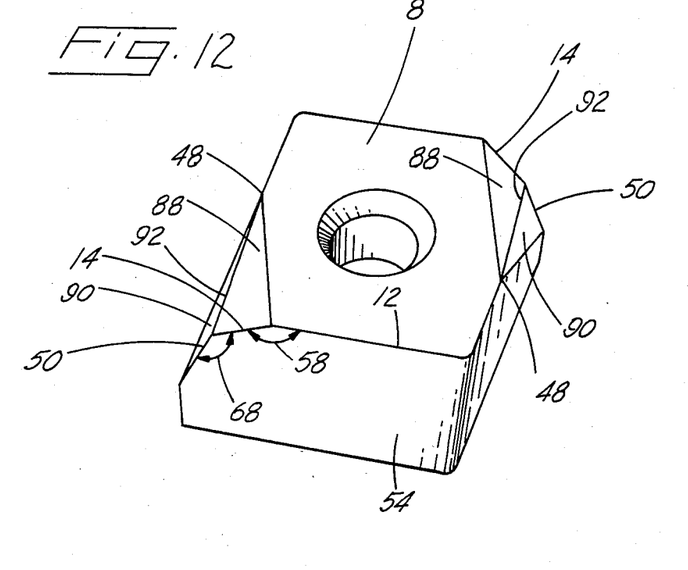
FIG. 12 is a perspective view of another insert according to the invention.
Figure 13:
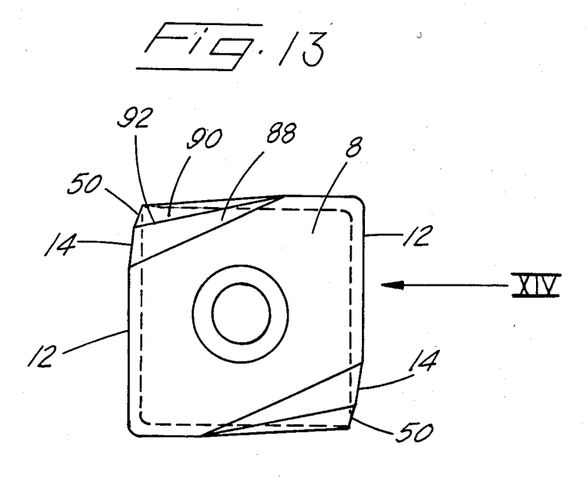
FIG. 13 is a plan view of the insert of FIG. 12.
Figure 14:
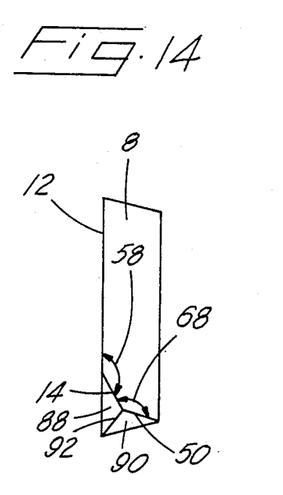
FIG. 14 is a view of FIG. 13 in the direction of arrow XIV.

In another embodiment of the insert, as shown in FIGS. 12 through 14, each of the second cutting edges 14 joins with at least one other cutting edge 50 that extends toward the seating face.

Figure 15:
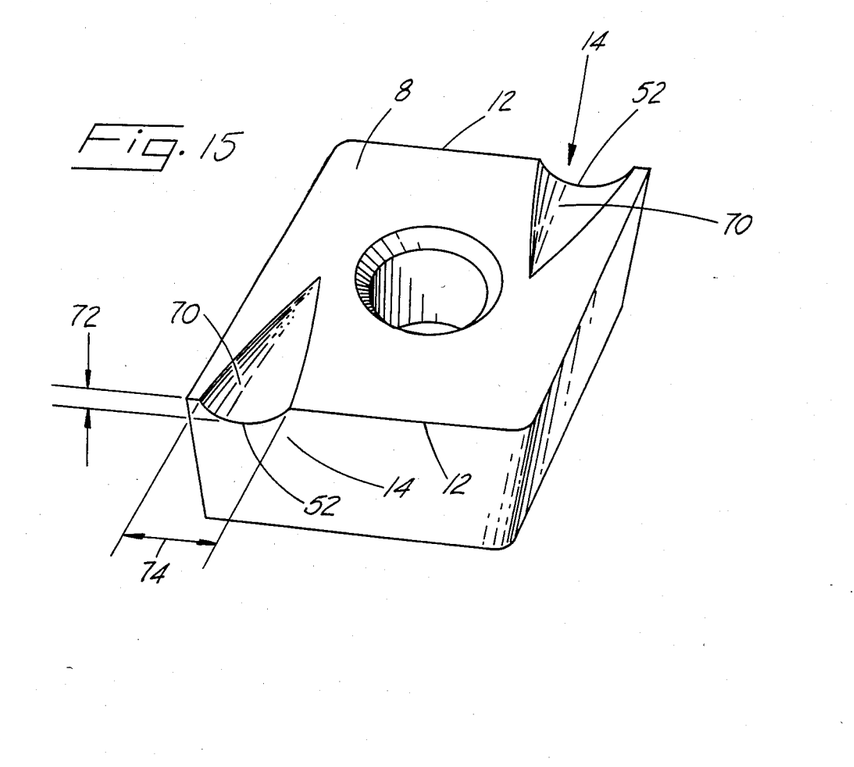
FIG. 15 is a perspective view of another insert according to the invention.
Figure 16:
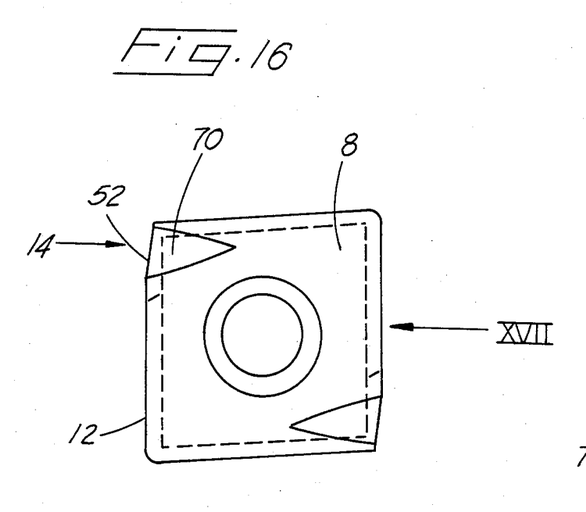
FIG. 16 is a plan view of the insert of FIG. 15.
Figure 17:
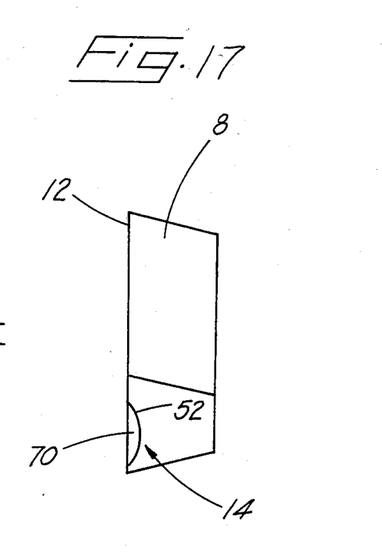
FIG. 17 is a view of the insert of FIG. 16 in the direction of arrow XVII.

In a further embodiment, as shown in FIGS. 15 through 17, each of the second cutting edges 14 of the insert is concave away from the seating face.

More particularly, as best seen in FIGS. 6 through 8, there is a top 76 and a bottom 78 parallel to the top joined by four lateral faces 80. At least one of the lateral faces is a clearance face 54. The clearance face has a first cutting edge 12 which is formed by the intersection of the top 76 and the clearance face 54. There is a second cutting edge 14 intersecting at 82 the first cutting edge at an included angle 58 of greater than 90 degrees when viewed perpendicularly to the clearance face. The second cutting edge is formed by the intersection of a rake face 24 of the second cutting edge and the clearance face. The rake face is defined by a plane which intersects the clearance face at 14, one of the lateral faces at 84 and the top at 86. This plane is not perpendicular to either of the clearance face, the one of the lateral faces or the top so that a flat is formed extending away from the second cutting edge.

Most preferably, the insert is indexable.

Preferably, the insert is in the shape of a diamond when viewed in plan and the smaller of the included angles at 26 of the diamond is between 75 degrees and 85 degrees. With a diamond shape, there would normally be two cutting positions.

Preferably, also, the insert is in the shape of a square when viewed in plan, and there would normally be four cutting positions.

In another embodiment of the insert, as shown in FIGS. 12 through 14, the second cutting edge comprises a plurality of cutting segments. The orientation of each of the segments differs in orientation from the previous cutting segment so that, when viewed perpendicular to the clearance face 54, the included angle 58 between the first 14 of the segments and the first cutting edge 12 and the included angle 68 between each subsequent cutting segment 50 and the previous cutting segment is greater than 90 degrees. Each of the segments has a rake face 88 and 90 which differs in orientation corresponding to the differing in orientation of each of the segments 14 and 50, respectively. Each of the rake faces intersects the rake faces on either side thereof. As shown in the figures, rake faces 88 and 90 would intersect at 92. The lines of intersection formed by the rake faces all converge to a point 48 away from the segments.

In a further embodiment of the insert, as shown in FIGS. 15 through 17, the second cutting edge 14 has a concave portion 52 and a corresponding concave axial rake face 70. The concave portion and the axial rake face form a groove which narrows in depth 72 and width 74 away from the cutting force.

Modifications may be made within the scope of the appended claims.

What is claimed is:

1. In a drill, the combination comprising:
   (a) a shank having a central axis of rotation and a reduced diameter portion with an end and a recess formed in said end of said reduced diameter portion;
   (b) at least one indexable insert having a perforation formed therein; and
   (c) fastening means passing through said perforation in said recess and terminating in said recess in said reduced diameter portion for holding said insert on said end of said reduced diameter portion of said shank;
   (d) said insert including
      (i) a body of hard wear resistant material having top and bottom faces and a peripheral wall joining said top and bottom faces, one of said top and bottom faces acting as a seating face and the other acting as a cutting face,
      (ii) first cutting edges formed on opposite sides of said cutting face at the juncture of said cutting face with said peripheral wall, and (iii) second cutting edges formed on said opposite sides of said cutting face extending from said cutting face toward said seating face, one end of each of said first cutting edges terminating in a juncture with one of said second cutting edges;

(iv) each of said first cutting edges having a negative radial rake surface and each of said second cutting edges having a negative axial and positive radial rake surface;

(v) corresponding ones of said first and second cutting edges when disposed in a cutting orientation on said end of said shank cooperating to form a radiused hole when rotated about said central axis of said shank with said central axis of rotation passing through the axial rake face of said second cutting edge.

2. The drill of claim 1 wherein said first cutting edge has zero axial rake.

3. The drill of claim 1 wherein said first cutting edge has positive axial rake.

4. The drill of claim 1 wherein said first cutting edge is substantially perpendicular to said central axis of rotation so that a hole with a substantially flat bottom is formed.

5. The drill of claim 1 wherein said insert is in the shape of a diamond when viewed in plan and the smaller of the included angles of said diamond is between 75 degrees and 85 degrees.

6. The drill of claim 1 wherein said insert is in the shape of a square when viewed in plan.

7. The drill of claim 1 wherein said second cutting edge axial rake face extends outwardly with respect to said insert so as to break out of said insert.

8. The drill of claim 1 wherein said insert has at least one other cutting edge having negative axial and positive radial rake surfaces, said at least one other cutting edge cooperating with said first and second cutting edges to form a radiused hole when rotated about said central axis.

9. The drill of claims 1 wherein said second cutting edge is concave.

10. The drill of claim 1 wherein said cutting insert also has a clearance face associated with corresponding ones of said first and second cutting edges, each of said first cutting edges extending inwardly and parallel to a plane containing said axis of rotation, each of said second cutting edges extending inwardly from said corresponding one first cutting edge and, when viewed from the end, forming an included angle of greater than 90 degrees therewith, said corresponding ones of said first and second cutting edges oriented along the forward portion, in the rotational sense, of said clearance face associated therewith, each said clearance face intersecting said plane without intersecting said axis of rotation.

11. The drill of claim 1 further comprising means for supplying coolant which are internal to said shank and exit said shank at said end of said reduced diameter portion.

12. The drill of claim 1 wherein said second cutting edge comprises a plurality of cutting segments, the orientation of each of said segments differing in orientation from the previous cutting segment so that when viewed from the end the included angle between the first of said segments and said first cutting edge and between each subsequent cutting segments and the previous cutting segment is greater than 90 degrees.

13. The drill of claim 1 wherein said second cutting edge is substantially concave, said concave cutting edge and its axial rake face forming a groove which narrows in depth and width away from said concave cutting edge.

14. The drill of claim 1 wherein said second cutting edge comprises a plurality of cutting segments, the orientation of each of said segments differing in orientation from the previous cutting segment so that when viewed perpendicular to the clearance face, the included angle between the first of said segments and said first cutting edge and between each subsequent cutting segment and the previous cutting segment is greater than 90 degrees, each of said segments having a rake face which differs in orientation corresponding to the differing in orientation of each of said segments, each of said rake faces intersecting the rake faces on either side thereof, the lines of intersection formed by said rake faces all converging to a point away from said segments.

15. The drill of claim 1 wherein said second cutting edge has a concave portion and a corresponding concave axial rake face, said concave portion and axial rake face forming a groove which narrows in depth and width away from said concave cutting portion.

* * * * *